United States Patent [19]

Gommel

[11] Patent Number: 4,625,849
[45] Date of Patent: Dec. 2, 1986

[54] CENTRIFUGAL CLUTCH
[75] Inventor: Reinhard Gommel, Backnang, Fed. Rep. of Germany
[73] Assignee: Andreas Stihl, Waiblingen, Fed. Rep. of Germany
[21] Appl. No.: 646,958
[22] Filed: Sep. 4, 1984
[30] Foreign Application Priority Data
  Sep. 10, 1983 [DE] Fed. Rep. of Germany ....... 3332766
[51] Int. Cl.$^4$ .................... F16D 23/10; F16D 43/24
[52] U.S. Cl. .................... 192/105 BA; 192/76
[58] Field of Search .............. 192/76, 105 A, 105 BA, 192/105 BB

[56] References Cited
U.S. PATENT DOCUMENTS

| 2,000,713 | 5/1935 | Norris | 192/105 BA |
| 2,703,163 | 3/1955 | Millar | 192/105 BA |
| 2,753,967 | 7/1956 | Bowers | 192/105 BA |
| 3,680,674 | 8/1972 | Horstman | 192/105 BA |
| 3,768,611 | 10/1973 | Frederickson | 192/105 BA |
| 4,227,601 | 10/1980 | Pilatowicz | 192/105 BA |

Primary Examiner—Lawrence Staab
Attorney, Agent, or Firm—Walter Ottesen

[57] ABSTRACT

The invention is directed to a centrifugal clutch provided in particular for use in a motor-driven chain saw. The centrifugal weights are axially secured on the carrier by respective holders. The holders are slid onto the centrifugal weights and have each two legs which straddle the carrier and at least partially straddle the centrifugal weights. The holders are of light weight, of simple configuration and prevent the centrifugal weights from moving axially relative to the holders thereby avoiding possible damage to the holders.

29 Claims, 19 Drawing Figures

CENTRIFUGAL CLUTCH

FIELD OF THE INVENTION

The invention relates to a centrifugal clutch for small motors such as motors for hand-guided portable tools such as chains saws, cut-off machines and lawn mowers. The centrifugal clutch is also appropriate for mopeds or the like. The centrifugal clutch includes a clutch drum arranged in surrounding relationship to a carrier upon which centrifugal weights are mounted so as to be displaceable in the radial direction. The carrier is rotatable about an axis of rotation and the centrifugal weights are held against movement in the direction of this axis.

BACKGROUND OF THE INVENTION

Centrifugal clutches transmit the torque from an input drive shaft of a motor to an output driven member only when the input drive shaft has reached a predetermined speed. The carrier is fixedly connected to the input shaft so as to rotate therewith. Centrifugal weights are supported on the carrier so as to be slideable in the radial direction and rotatable therewith. On the other hand, the clutch drum is fixedly connected with the output driven member so as to rotate therewith. The clutch drum is rotatable relative to the input shaft and the carrier with its centrifugal weights when the clutch is not engaged. As soon as the input shaft with its carrier has reached a predetermined speed, the centrifugal force will move the centrifugal weights outwardly in the radial direction until they frictionally engage and entrain the clutch drum thereby causing it and the connected output driven member to follow their rotational movement. The centrifugal clutch is provided with axial securing means to ensure an exact alignment of the centrifugal weights relative to the clutch drum as is required for a reliable force transmission.

In a known centrifugal clutch of the aforementioned type, both axial securing means are in the form of retaining discs or washers. The discs are provided on respective sides of the carrier and secure the centrifugal weights against axial displacement on the carrier. The discs are connected to the carrier so that they rotate therewith and are of complex construction since they have to secure all centrifugal weights against axial displacement. The retaining discs extend from an area close to the axis of the centrifugal clutch radially outwardly over and beyond the radius of the centrifugal clutch. The retaining discs have to be relatively thick to be able to take up the forces exerted thereon at a relatively large movement arm without becoming deformed which, however, makes the discs relatively large and heavy. Since the discs provide axial support for all centrifugal weights simultaneously, a relatively large axial clearance may occur with relatively low manufacturing tolerances of the centrifugal weights and/or the discs, allowing movement of the centrifugal weights relative to the discs during operation. The result is deformation and wear of the discs which may adversely affect the accurate axial alignment of the centrifugal weights.

SUMMARY OF THE INVENTION

It is an object of the invention to provide a centrifugal clutch of the type discussed above wherein the centrifugal weights are axially secured so that the axial securing means ensures a safe and clearance-free axial alignment of the centrifugal weights at optimum construction and material requirements.

By substituting the individual holders of the clutch arrangement of the invention for at least the one retaining disc, each centrifugal weight is provided on one end surface thereof with a separate axial securing means. This permits the holders, which may be arranged at either the carrier or the centrifugal weights, to be arranged directly at the location where the centrifugal weights and the carrier are connected with each other. The centrifugal weights are thereby prevented from acting on the holders with a large movement arm. The relatively low forces still occurring can be easily taken up also by small, simple and lightweight holders.

Material and manufacturing cost can be substantially reduced because of the simple construction and low weight of the holders. The individual holders may be arranged at the centrifugal weights independently of each other so that an excessive axial clearance between the holders and the centrifugal weights can be avoided. In particular, each holder may be adapted to the axial position of the centrifugal weight associated therewith, thereby enabling each centrifugal weight to be secured in its relevant axial position independently of the other centrifugal weight. The holders thus provide a very reliable means for guiding the centrifugal weights and for holding them in axial alignment.

BRIEF DESCRIPTION OF THE DRAWING

These and other advantages of the invention will appear from the following description of the preferred embodiments of the invention, taken together with the drawing, wherein:

FIGS. 15 and 16 are top plan and side elevation views, respectively, of a fourth embodiment of a centrifugal clutch of the invention, including a first axial holder and a second axial holder;

FIG. 17 is a top plan view of a portion of the second axial holder of the centrifugal clutch of FIG. 15; and, FIGS. 18 and 19 are side elevation and end views, respectively, of the first axial holder of the embodiment of FIG. 15.

DESCRIPTION OF THE PREFERRED EMBODIMENTS OF THE INVENTION

The centrifugal clutch of FIGS. 1 to 5 is provided for use in a motor-driven chain saw (not shown). It includes a carrier 1 for three centrifugal weights 2, 3 and 4 which are surrounded by a cup-shaped clutch drum 5. A centrally arranged chain wheel 7 for a saw chain (not shown) of the motor-driven chain saw is provided on the lower side of the base 6 of clutch drum 5.

Figure 1:
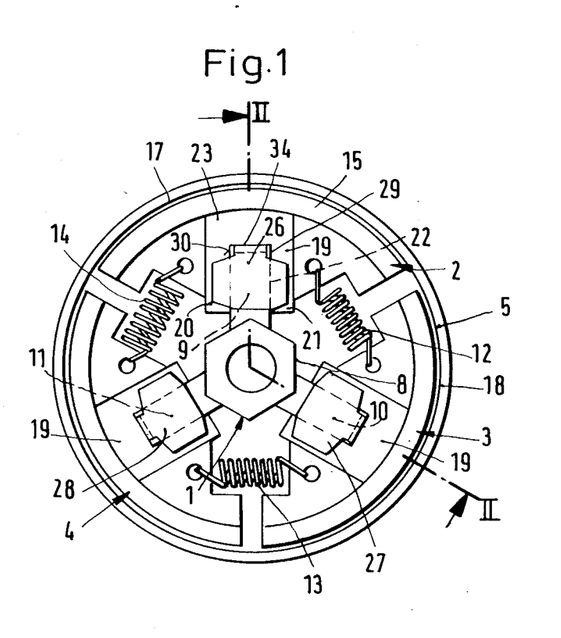
FIG. 1 is a top plan view of a centrifugal clutch according to the invention including axial holders for holding respective centrifugal weights.
Figure 2:
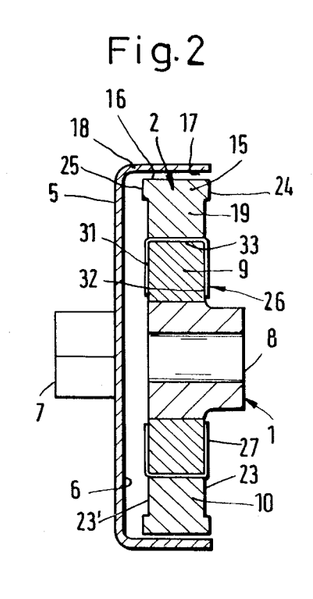
FIG. 2 is an elevation view, partially in section, taken along the line II—II of FIG. 1.

Carrier 1 has a central hub 8 fixedly seated on a shaft (not shown) of a drive motor of the motor-driven chain saw. Hub 8 is surrounded by clutch drum 5 and has radially extending arms 9 to 11 on which respective centrifugal weights 2 to 4 are mounted so as to be displaceable in a direction radially of the axis of rotation of the carrier 1.

Centrifugal weights 2 to 4 are all of identical configuration and are spaced at a small distance one from the other in the direction of the periphery of the centrifugal clutch. The centrifugal weights are interconnected by tension springs 12 to 14 that extend in the peripheral direction of the centrifugal clutch and bias the centrifugal weights in the direction of their rest position shown in FIG. 1. Centrifugal weights 2 to 4 have each an arcuate rib 15 curved around the axis of hub 8 in the manner of a segment of a circle. In the radially extended or active position of the centrifugal weights, the outer surface 16 of the rib 15 rests against an inner surface 17 of the casing 18 of clutch drum 5 to entrain the latter.

Projecting from rib 15 is a U-shaped connector 19 (FIG. 1) having legs 20 and 21 for conjointly defining receiving opening 22 for accommodating a corresponding one of the carrier arms 9, 10, 11. The plane of symmetry between the two legs 20 and 21 coincides with an axial plane of the clutch and the legs 20, 21 lie in contact engagement with the two surfaces of the corresponding carrier arm which are parallel to this axial plane (FIG. 1). The axial width of rib 15 is slightly greater than the axial thickness of connector 19 as shown in FIG. 2. The end surfaces of connector 19 and of its respective carrier arm 9, 10, and 11 lie in a common radial plane to combine to form end surface sections 23 and 23′ which are axially recessed relative to the corresponding end surfaces 24 and 25 of the rib 15 (FIG. 2).

To secure centrifugal weights 2 to 4 against axial displacement on the respective arms 9 to 11 of carrier 1, an axial securing means in the form of U-shaped holders 26 to 28 are provided at the end surfaces of the centrifugal weights. Holders 26 to 28 are of identical configuration and only holder 26 will be described in more detail in the following.

Figures 3, 5:
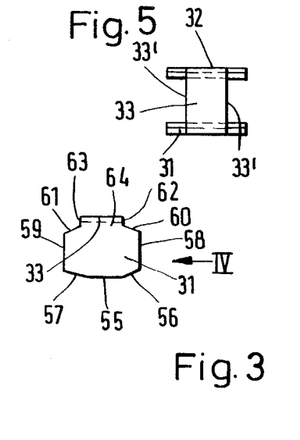
FIG. 3 is a side elevation view of the axial holder of the centrifugal clutch of FIG. 1.
FIG. 5 is a top plan view of the axial holder of FIG. 3.
Figure 4:
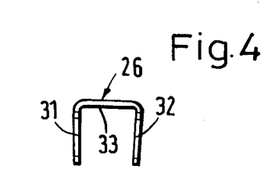
FIG. 4 is an end view of the axial holder of FIG. 3, the axial holder being viewed in the direction of arrow IV of FIG. 3.
Figure 6:
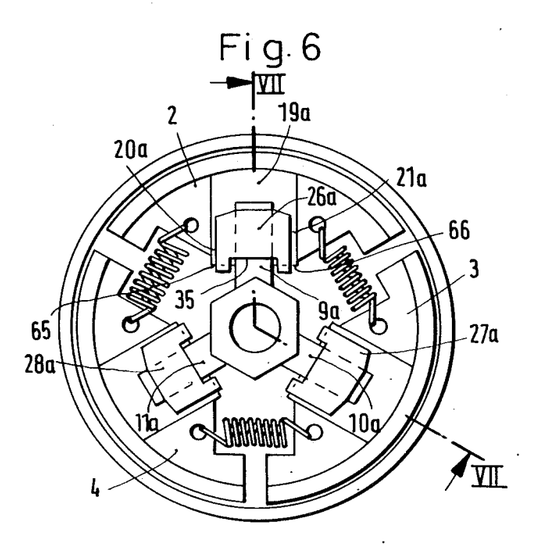
FIGS. 6 and 7 are top plan and side elevation views, respectively, of another embodiment of a centrifugal clutch according to the invention including an axial holder.
Figure 7:
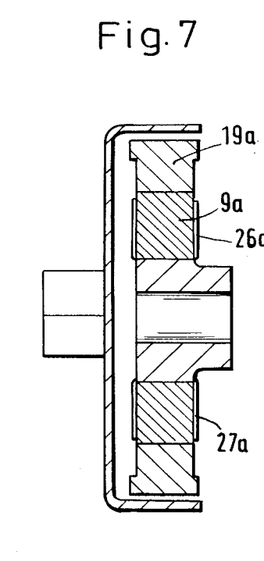

As shown in FIGS. 3 to 5, legs 31 and 32 of holder 26 are approximately twice the width of a cross member 33 connecting the legs. With the holder 26 mounted, cross member 33 is seated in receiving opening 22 of connector 19 of the corresponding centrifugal weight and rests against the base 34 of the opening. To secure holder 26 against displacement in the peripheral direction of the clutch, cross member 33 of holder 26 is of the same thickness as base 34 of the receiving opening 22; this causes the cross member to abut mutually adjacent inner sides 29, 30 of legs 20, 21 of connector 19 (FIG. 1).

Legs 31, 32 of holder 26 preferably extend by the same amount beyond the ends of cross member 33 which is of a preferably rectangular profile (FIG. 5). The legs are of identical configuration and are of a substantially rectangular profile. The mid segment 55 of the lower edge of the legs 31, 32 extends parallel to the cross member 33 and then continues in edge segments 56, 57 which diverge from the mid segment 55 towards the plane of the cross member 33 and form respective obtuse angles with mutually parallel edges 58, 59. Edge segments 60, 61 define respective obtuse angles with edges 58, 59 and converge in the direction of cross member 33 and connect with edges 62, 63. These edges extend at right angles to the cross member 33 and bound it laterally as viewed in the side elevation view of FIG. 3. Edges 62, 63 bound a projection 64 extending over legs 31, 32. Cross member 33 is therefore at a small distance from upper edges 60, 61 of legs 31, 32.

Legs 31, 32 extend substantially over the entire width of connector 19 (FIG. 1) and thereby straddle the end surfaces of arms 9 to 11 of carrier 1 completely. Moreover, the height of legs 31, 32 is approximately equal to the depth of receiving opening 22, at least in their mid section, ensuring an extremely large and thus safe abutting contact area between holders 26 to 28 and centrifugal weights 2 to 4. In their mounted position, legs 31, 32 of holders 26 to 28 abut the two end surface sections 23, 23′ of carrier arms 9 to 11 and of legs 20, 21 of connectors 19 of centrifugal weights 2 to 4 (FIG. 2). Thus, holders 26 to 28 axially secure centrifugal weights 2 to 4 relative to carrier arms 9 to 11 in both axial directions.

Legs 31, 32 of holders 26 to 28 are preferably resilient clamping legs. For this purpose, the two legs 31 and 32 converge toward each other from cross member 33 as shown in FIG. 4. Thus, when holders 26 to 28 are slid onto carrier arms 9 to 11, they will be urged apart elastically, so that upon insertion of the carrier arms into receiving opening 22 the holders will be biased against the axial end surfaces of carrier arms 9 to 11 and of legs 20 and 21 of connectors 19, which eliminates any clearance. The resiliency of legs 31, 32 enables holders 26 to 28 to be slid onto the centrifugal weights readily and to be held there safely. In the mounted position, cross member 33 rests with its entire surface against the base 34 of receiving opening 22.

In a preferred embodiment, holders 26 to 28 are configured or mounted so as to be clamped or held only at connectors 19 as a result of which they are displaced radially outwardly together with centrifugal weights 2 to 4. In this case, their mass is to be added to the moving mass of centrifugal weights 2 to 4 so that the latter mass may be reduced by the mass of the holders. Holders 26 to 28 may have their cross member 33 rigidly fastened to base 34 of receiving opening 22 of connectors 19, for example, by welding or gluing.

The relatively small holders 26 to 28 which are only provided in the area of connectors 19 of centrifugal weights 2 to 4 permit substantial savings in material to be realized and permit the weight of the centrifugal clutch to be reduced considerably. The U-shaped configuration and arrangement of holders 26 to 28 in the manner described enables the carriers 1 and the centrifugal weights 2 to 4 to be of simple construction; thus, none of these parts is required to have shoulders for axial guidance of the centrifugal weights. This simple form also enables the holders to be easily manufactured.

The holders may be manufactured as simple stamped and bent parts; however, they may also be bent from wire strip in a simple manner. Since each centrifugal weight is provided with one holder to secure the weight against movement in the direction of the rotational axis of the clutch and since legs 31 and 32 of holders 26 to 28 rest with their entire surface against end surface sections 23, 23', the holders or their legs 31, 32 may be relatively thin so that they do not protrude beyond end surfaces 24, 25 of rib 15 of centrifugal weights 2 to 4 (FIG. 2). The centrifugal clutch of the invention requires particularly little space for its accommodation in the motor-driven chain saw because of its compact construction.

The embodiment of FIGS. 6 to 10 differs from the centrifugal clutch of FIGS. 1 to 5 merely by the different configuration of its holders 26a to 28a.

Figure 8:
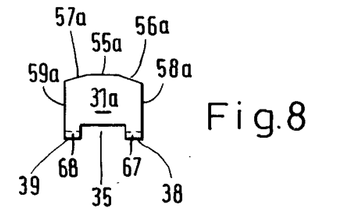
FIGS. 8 to 10 are side elevation, end and top plan views, respectively, of the axial holder of the centrifugal clutch of FIGS. 6 and 7.
Figure 9:
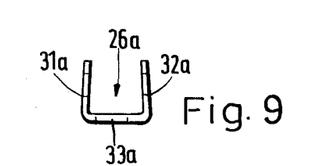
Figure 10:
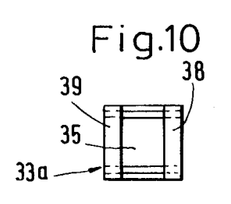

As shown especially in FIGS. 8 to 10, cross member 33a of holder 26a is of the same width as legs 31a, 32a and has a central aperture 35. The central aperture 35 matches the outline of the respective carrier arms 9a to 11a and extends into legs 31a, 32a (FIG. 8). This configuration enables the holders 26a to 28a to slide easily over the carrier arms when the centrifugal weights are assembled. In this embodiment, holders 26a to 28a are not inserted into the receiving opening 22 of the centrifugal weights; instead, the holders are slid onto connectors 19a such that the edge sections 38, 39 of cross member 33a, which define the boundary of aperture 35, rest on end surfaces 65, 66 of legs 20a, 21a of connectors 19a (FIG. 6), with legs 31a, 32a of the holders extending outwardly in the radial direction from the edge sections 38, 39. Legs 31a, 32a of holders 26a to 28a are substantially of the same configuration as those of the embodiment of FIGS. 1 to 5.

In lieu of projection 64, aperture 35 is provided which extends into the legs 31a, 32a and is of rectangular outline (FIG. 10). Further, legs 31a, 32a have no edge sections 61, 62. Instead, narrow edge segments 58a, 59a of legs 31a, 32a continue at right angles into longitudinal edge sections 67, 68 extending up to aperture 35. Longitudinal edge segments 55a to 57a are of the same configuration as in the previous embodiment; however, here the holders are slid radially onto the connectors in the opposite direction.

Legs 31a, 32a of holders 26a to 28a may extend parallel to each other and be of rigid construction as in the embodiment of FIGS. 1 to 5. However, in order to positively eliminate any axial clearance of centrifugal weights 2 to 4 relative to carrier arms 9a to 11a, legs 31a, 32a are preferably resilient clamping legs in accordance with the previous embodiment. Further, holders 26a to 28a are likewise preferably tightly connected with centrifugal weights 2a to 4a so that their mass is part of the centrifugal weight mass. The holders preferably have edge sections 38, 39 of cross member 33a fastened to end surfaces 65, 66 or legs 20a, 21a of connectors 19a by means of welding, gluing or the like. In order to prevent holders 26a to 28a from obstructing the radial displacement of centrifugal weights 2a to 4a, the width of aperture 35 or the spacing between the edge sections 38, 39 of holder cross member 33a is slightly larger than the width of carrier arms 9a to 11a. The dimensions of holders 26a to 28a relative to connectors 19a and carrier arms 9a to 11a are identical to the ones of the preceding embodiment. This embodiment, too, affords the above-described advantages.

In the embodiment of FIGS. 11 to 14, centrifugal weights 2b to 4b are secured against axial displacement on the side thereof facing away from the base 5b of the clutch drum by conventional means, namely, by using a single disc 40 (FIG. 12) that is fastened to hub 8b of carrier 1b. For clarity, the disc 40 is omitted in FIG. 11. To prevent axial displacement of the centrifugal weights in the direction toward the base 5b of the clutch drum, holders 26b to 28b are provided which, in contrast to the two above-described embodiments, act as securing means only in the one axial direction.

Figure 12:
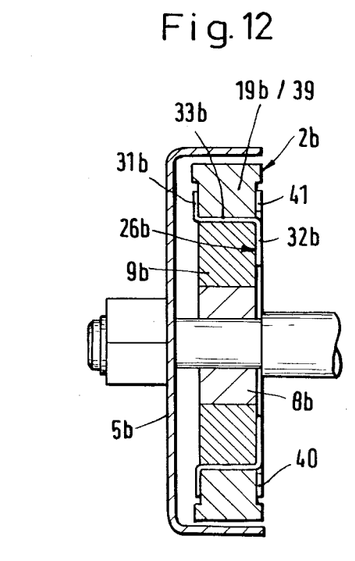
FIG. 12 is an elevation view, partially in section, taken along the line XII—XII of FIG. 11 showing also the second axial holder.
Figure 13:
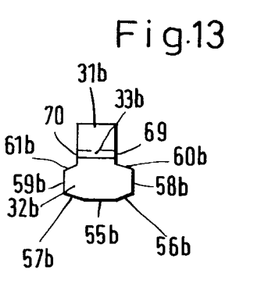
FIGS. 13 and 14 are side and elevation views, respectively, of the first axial holder of the embodiment of FIG. 11.
Figure 14:
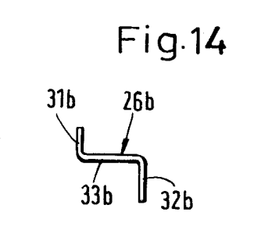

As FIGS. 12 and 13 show, these holders are bent to have a Z-shape. Radially outwardly extending leg 31b is slightly shorter than radially inwardly extending leg 32b. From cross member 33b, shorter leg 31b is slightly bent inwardly in the direction of the other leg 32b; whereas, the other longer leg 32b extends at a right angle to the cross member 33b. Shorter leg 31b is of the same width as cross member 33b; whereas, longer leg 32b protrudes laterally beyond cross member 33b and leg 31b on both sides (FIG. 13). Leg 31b has a quadratic profile which for the embodiment shown is a square. Longitudinal edge segments 55b to 57b opposite cross member 33b are of the same configuration as in the two previously described embodiments. Mutually parallel sides 58b, 59b are connected with parallel longitudinal edges 69, 70 of the cross member via edge segments 60b, 61b lying at obtuse angles thereto and converging in the direction of cross member 33b.

Figure 11:
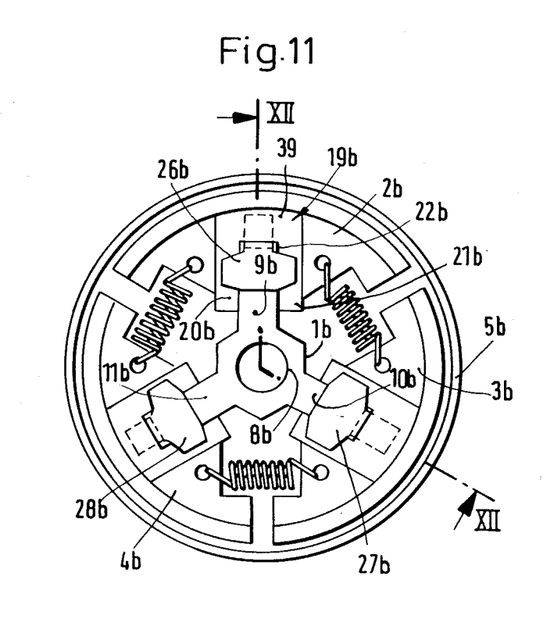
FIG. 11 is a top plan view of a third embodiment of a centrifugal clutch according to the invention and includes a first axial holder and a second disc-shaped axial holder of which only the first axial holder is shown.

Holders 26b to 28b are inserted into receiving opening 22b of connectors 19b of centrifugal weights 2b to 4b. As in the previously described embodiments, holders 26b to 28b rest with their cross member 33b against the radially outer end faces of carrier arms 9b to 11b when the centrifugal weights 2b to 4b are in their radially inner rest positions. The shorter leg 31b of holders 26b to 28b is in contact engagement with the side of a cross member 39 of U-shaped connector 19b, this side of cross member 39 facing the base 5b of the clutch drum (FIGS. 11 and 12).

On the opposite side, long leg 32b is in contact engagement with carrier arms 9b to 11b extending into receiving openings 22b, and with legs 20b and 21b of connectors 19b. Since legs 32b of holders 26b to 28b straddle carrier arms 9b to 11b, centrifugal weights 2b to 4b are reliably secured against axial displacement in the direction toward the base 5b of the clutch drum. The height of legs 32b is less than the height of the legs of the previously described holders and about half the radial depth of receiving openings 22b. Nevertheless, a very safe axial support of the centrifugal weights 2b to 4b on carrier 1b is ensured.

In this embodiment, too, at least one of the legs 31b of holders 26b to 28b is a resilient clamping leg which is bent outwardly elastically when being slid onto a corresponding one of the carrier arms 9b to 11b and is resiliently biased against the lateral surface of the carrier arm. Moreover, holders 26b to 28b are preferably fastened to the centrifugal weights 2b to 4b, in particular at their cross member 33b. The width of cross member 33b is slightly less than the width of receiving opening 22b of connectors 19b so that the holders 26b to 28b can be readily inserted into their receptacles without the need to maintain close manufacturing tolerances. Because holders 26b to 28b act to secure the weights against displacement in only one axial direction, that is, by means of leg 32b, it will suffice if the leg 32b supports itself upon carrier arms 9b to 11b. However, if legs 32b also straddle legs 20b, 21b of connectors 19b, the holding legs will have a large bearing surface which helps to reduce wear on the holders, the carrier arms and the centrifugal weights.

Legs 32b of holders 26b to 28b are received in suitable window-like openings 41, 49, 50 of retaining disc 40, with clearance being provided all around the leg as will be explained with reference to the embodiment of FIGS. 15 to 17. The radial clearance between legs 32b and 32c and openings 41, 49, 50 is selected so as to enable holders 26b to 28b and 26c to 28c, respectively, to be displaced in the radially outward direction together with corresponding ones of the centrifugal weights.

Legs 31b and 32b are of the same thickness as disc 40 so that they do not axially protrude therebeyond. Because openings 41, 49, 50 are relatively large, disc 40 has a low weight. However, the openings are just large enough to provide connectors 19b with a sufficiently large abutting surface to secure the weights against axial displacement.

Although in this embodiment the one axial securing means is a conventional disc, substantial material and manufacturing cost savings and a significant reduction in the weight of the centrifugal clutch can be realized by omitting the other retaining disc which is provided in known centrifugal clutches. Holders 26b to 28b ensure a simple and compact configuration of the centrifugal clutch.

Figure 15:
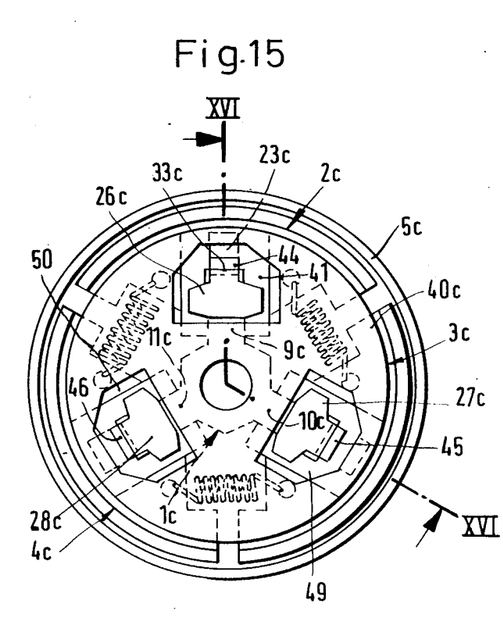
Figures 16, 17, 18, 19:
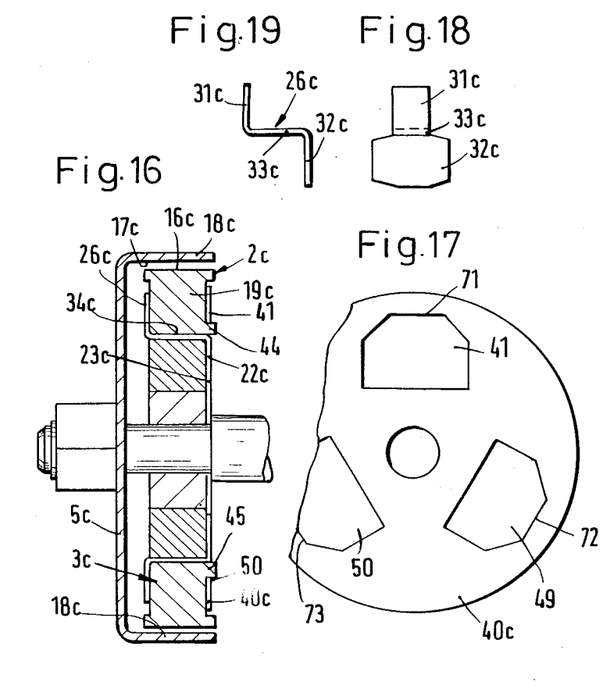

To prevent the centrifugal weights from being centrifuged outwardly in the radial direction when the friction surface 17c of clutch drum 5c is worn down, an additional securing means is provided in the embodiment of FIGS. 15 to 19. This centrifugal clutch differs from the embodiment of FIGS. 11 to 14 merely by a rib-like shoulder 44 to 46 provided on centrifugal weights 2c to 4c above base 34c of their receiving openings 22c. These shoulders 44 to 46 extend axially outwardly over end surface section 23c of carrier arms 9c to 11c and of connectors 19c. They are of the same width as cross members 33c of holders 26c to 28c and extend into the respective window-like openings 41, 49, 50 of retaining disc 40c (FIGS. 15, 16).

In the radial inner end position of centrifugal weights 2c to 4c shown and in which friction surfaces 16c are spaced from friction surface 17c of clutch drum 5c, shoulders 44 to 46 are directly next to the free ends of arms 9c to 11c. Should friction surface 17c of clutch drum 5c be worn down to such a great extent that there is the risk of centrifugal weights 2c to 4c breaking through drum casing 18c of the clutch drum under the action of the centrifugal force, shoulders 44 to 46 will abut the radially outer edge 71 to 73 of openings 41, 49, 50 of retaining disc 40. This will stop centrifugal weights 2c to 4c from moving any further in the radially outward direction. Thus, retaining disc 40c also serves to check the movement of centrifugal weights 2c to 4c.

Holders 26c to 28c are Z-shaped and their legs 31c, 32c are connected with each other by cross member 33c. Leg 31c is preferably a resilient clamping leg so that centrifugal weights 2c to 4c are seated on carrier 1c without axial clearance as described with reference to the previous embodiment.

It is understood that the foregoing description is that of the preferred embodiments of the invention and that various changes and modifications may be made thereto without departing from the spirit and scope of the invention as defined in the appended claims.

What is claimed is:

1. A centrifugal clutch for small motors such as for hand-guided portable apparatus including chain saws, cut-off machines, mopeds or the like comprising:
    a carrier adapted to be rotatably driven by the motor of the apparatus thereby defining an axis of rotation;
    a clutch drum disposed in surrounding relationship to said carrier;
    a plurality of centrifugal weights disposed within said clutch drum;
    connecting means for slidably connecting and guiding said weights on said carrier for movement in a direction radial of said axis between a rest position whereat said weights are disengaged from said drum and an active position whereat said weights are in contact engagement with said drum for transmitting torque thereto from said carrier; and,
    a plurality of holders corresponding to respective ones of said weights for securing said weights against movement parallel to said axis;
    said connecting means including: a plurality of receiving means formed on said centrifugal weights, respectively; and, a plurality of engaging means formed on said carrier for engaging corresponding ones of said weights at said receiving means thereof; each of said weights and the receiving means corresponding thereto defining two end faces facing in respective opposite directions along said axis; and,
    each one of said holders being a single unitary sheet metal piece including a mid portion extending between said end faces parallel to said axis and two legs extending at right angles from said mid portion for engaging corresponding ones of said end faces and at least one of said legs overlapping said engaging means thereby preventing a movement of said weights relative to said carrier in a direction parallel to said axis.

2. The centrigual clutch of claim 1, one of said legs extending radially outwardly and the other one of said legs extending radially inwardly.

3. The centrifugal clutch of claim 2, each one of said holders having a Z-shape.

4. The centrifugal clutch of claim 3, at least one of said legs being formed so as to be resilient.

5. The centrifugal clutch of claim 4, said other one of said legs being formed so as to resiliently press against one of said end faces at a location outwardly beyond said engaging means of said carrier.

6. A centrifugal clutch for small motors such as for hand-guided portable apparatus including chain saws, cut-off machines, mopeds or the like comprising:
    a carrier adapted to be rotatably drive by the motor of the apparatus thereby defining an axis of rotation;
    a clutch drum disposed in surrounding relationship to said carrier;
    a plurality of centrifugal weights disposed within said clutch drum;
    connecting means for slidably connecting and guiding said weights on said carrier for movement in a direction radial of said axis between a rest position whereat said weights are disengaged from said drum and an active position whereat said weights are in contact engagement with said drum for transmitting torque thereto from said carrier; and, a plurality of holders corresponding to respective ones of said weights for securing said weights against movement parallel to said axis;

said connecting means including a plurality of receiving means formed on said centrifugal weights, respectively; and, a plurality of engaging means formed on said carrier for engaging corresponding ones of said weights at said receiving means thereof; each one of said weights and the receiving means corresponding thereto defining two end faces facing in respective opposite directions along said axis; and, each one of said holders being a single unitary sheet metal piece including a mid portion extending between said end faces parallel to said axis and two legs extending at right angles from said mid portion for engaging corresponding ones of said end faces and overlapping said engaging means thereby preventing a movement of said weights relative to said carrier in a direction parallel to said axis.

7. The centrifugal clutch of claim 6, said legs extending radially outwardly.

8. The centrifugal clutch of claim 7, each of said holders having a U-shaped configuration.

9. The centrifugal clutch of claim 8, at least one of said legs being formed so as to be resilient.

10. The centrifugal clutch of claim 6, said legs extending radially inwardly.

11. The centrifugal clutch of claim 10, each of said holders having a U-shaped configuration.

12. The centrifugal clutch of claim 11, at least one of said legs being formed so as to be resilient.

13. A centrifugal clutch for small motors such as for hand-guided portable apparatus including chain saws, cut-off machines, mopeds or the like comprising:

a carrier adapted to be rotatably drive by the motor of the apparatus thereby defining an axis of rotation, said carrier having a hub concentric with said axis and a plurality of carrier arms extending radially therefrom;

a clutch drum disposed in surrounding relationship to said carrier;

a plurality of centrifugal weights mounted on and corresponding to respective ones of said arms, each one of said weights having a radially extending U-shaped connecting portion formed thereon for slidably engaging the arm corresponding thereto for movement in the radial direction between a rest position whereat said weights are disengaged from said clutch drum and an active position whereat said weights are in contact engagement with said drum for transmitting torque thereto from said carrier;

a plurality of holders corresponding to respective ones of said weights for securing said weights against displacement in a first direction parallel to said axis; and, securing means for securing said weights against displacement in a second direction parallel to said axis and directly opposite to said first direction; and, each one of said weights and the connecting portion thereof defining two end faces facing in respective ones of said axial directions; each one of said holders being a single unitary sheet metal piece including a mid portion extending between said end faces parallel to said axis and two legs extending at right angles from said mid portion for engaging corresponding ones of said end faces and at least one of said legs overlapping the carrier arm associated with said weight.

14. A centrifugal clutch for small motors such as for hand-guided portable apparatus chain saws, cut-off machines, mopeds or the like comprising:

a carrier adapted to be rotatably driven by the motor of the apparatus thereby defining an axis of rotation, said carrier having a hub concentric with said axis and a plurality of carrier arms extending radially therefrom;

a clutch drum disposed in surrounding relationship to said carrier;

a plurality of centrifugal weights mounted on and corresponding to respective ones of said arms, each one of said weights having a radially extending U-shaped connecting portion formed thereon for slidably engaging the arm corresponding thereto for movement in the radial direction between a rest position whereat said weights are disengaged from said clutch drum and an active position whereat said weights are in contact engagement with said drum for transmitting torque thereto from said carrier;

a plurality of holders corresponding to respective ones of said weights for securing said weights against displacement in a first direction parallel to said axis;

each one of said weights and the connecting portion thereof defining two end faces facing in respective ones of said axial directions; each one of said holders including a mid portion and two legs extending from said mid portion for engaging corresponding ones of said end faces and at least one of said legs overlapping the carrier arm associated with said weight; and, said carrier arm having a radially outermost end face and said U-shaped connecting portion having a base between the legs thereof, said holder being mounted with respect to said weight and said arm so as to cause said mid portion to be disposed between said base and said outermost end face.

15. The centrifugal clutch of claim 14, said mid portion having a width approximately equal to the width of said base of said U-shaped connecting portion.

16. A centifugal clutch for small motors such as for hand-guided portable apparatus including chain saws, cut-off machines, mopeds or the like comprising:

a carrier adapted to be rotatably driven by the motor of the apparatus thereby defining an axis of rotation, said carrier having a hub concentric with said axis and a plurality of carrier arms extending radially therefrom;

a clutch drum disposed in surrounding relationship to said carrier;

a plurality of centrifugal weights mounted on and corresponding to respective ones of said arms, each one of said weights having a radially extending U-shaped connecting portion formed thereon for slidably engaging the arm corresponding thereto for movement in the radial direction between a rest position whereat said weights are disengaged from said clutch drum and an active position whereat said weights are in contact engagement with said drum for transmitting torque thereto from said carrier;

a plurality of holders corresponding to respective ones of said weights for securing said weights against displacement in a first direction parallel to said axis;

securing means for securing said weights against displacement in a second direction parallel to said axis and directly opposite to said first direction;

each one of said weights and the connecting portion thereof defining two end faces facing in respective ones of said axial directions; each one of said holders including a mid portion and two legs extending from said mid portion for engaging corresponding ones of said end faces and at least one of said legs overlapping the carrier arm associated with said weight; and, said securing means being a disc fixedly mounted to said carrier and extending radially outwardly to overlap said weights, a plurality of windows formed in said disc and being dimensioned for accommodating corresponding ones of said one leg therein.

17. The centrifugal clutch of claim 16, said one leg and said disc having approximately the same thickness.

18. The centrifugal clutch of claim 16, comprising abutment means formed at the interface of said disc and said weight for limiting the radial travel of said weight in the event that said drum wears through and said weight travels outwardly beyond said active position.

19. The centrifugal clutch of claim 18, said abutment means comprising a projection formed on said weight so as to extend through said window, said window being made sufficiently long in said radial direction to accommodate the movement of said weight between said rest position and said active position thereof, the upper edge of said window defining an abutment surface for receiving said projection when said weight moves radially outward beyond said active position thereof.

20. The centrifugal clutch of claim 13, all of said holders having the same configuration.

21. The centrifugal clutch of claim 13, comprising biasing means for resiliently biasing said weights into said rest position when said clutch is at standstill and the mass of said weights being selected to overcome the biasing force with centrifugal force at a predetermined rotational speed of said carrier whereafter said weights move into said active position.

22. A centrifugal clutch for small motors such as for hand-guided portable apparatus including chain saws, cut-off machines, mopeds or the like comprising:

a carrier adapted to be rotatably driven by the motor of the apparatus thereby defining an axis of rotation, said carrier having a hub concentric with said axis and a plurality of carrier arms extending radially therefrom;

a clutch drum disposed in surrounding relationship to said carrier;

a plurality of centrifugal weights mounted on and corresponding to respective ones of said arms, each one of said weights having a radially extending U-shaped connecting portion formed thereon for slidably engaging the arm corresponding thereto for movement in the radial direction between a rest position whereat said weight are disengaged from said clutch drum and an active position whereat said weights are in contact engagement with said drum for transmitting torque thereto from said carrier;

a plurality of holders corresponding to respective ones of said weights for securing said weights against displacement in a first direction parallel to said axis; and, each one of said weights and the connecting portion thereof defining two end faces facing in respective ones of said first axial direction and a second direction parallel to said axis and opposite to said first direction; each one of said holders including a mid portion and two legs extending from said mid portion for engaging corresponding ones of said end faces and overlapping said carrier arm associated with said weight thereby preventing a movement of said weights relative to said carrier in said first axial direction and in a second axial direction opposite said first axial direction.

23. A centrifugal clutch for small motors such as for hand-guided portable apparatus including chain saws, cut-off machines, mopeds or the like comprising:

a carrier adapted to be rotatably driven by the motor of the apparatus thereby defining an axis of rotation, said carrier having a hub concentric with said axis and a plurality of carrier arms extending radially therefrom;

a clutch drum disposed in surrounding relationship to said carrier;

a plurality of centrifugal weights mounted on and corresponding to respective ones of said arms, each one of said weights having a radially extending U-shaped connecting portion formed thereon for slidably engaging the arm corresponding thereto for movement in the radial direction between a rest position whereat said weights are disengaged from said clutch drum and an active position whereat said weights are in contact engagement with said drum for transmitting torque thereto from said carrier;

a plurality of holders corresponding to respective ones of said weights for securing said weights against displacement in a first direction parallel to said axis;

each one of said weights and the connecting portion thereof defining two end faces facing in respective ones of said first axial direction and a second direction parallel to said axis and opposite to said first direction; each one of said holders including a mid portion and two legs extending from said mid portion for engaging corresponding ones of said end faces and overlapping said carrier arm associated with said weight; and, said carrier arm having a radially outermost end face and said U-shaped connecting portion having a base between the legs thereof, said holder being mounted with respect to said weight and said arm so as to cause said mid portion to be disposed between said base and said outermost end face.

24. The centrifugal clutch of claim 23, said mid portion having an aperture therein for permitting the carrier arm associated therewith to pass therethrough.

25. The centrifugal clutch of claim 24, said mid portion having a width approximately equal to the width of said base of said U-shaped connecting portion.

26. The centrifugal clutch of claim 24, each one of said holders being mounted so as to cause said legs thereof to extend radially outwardly, said legs having approximately the same width as said mid portion.

27. The centrifugal clutch of claim 26, said legs of each one of said holders having a width approximately as wide as said U-shaped connecting portion of the centrifugal weight associated therewith.

28. The centrifugal clutch of claim 23, each of said holders being mounted so as to cause said legs thereof to extend radially inwardly, said legs having a width approximately as wide as said U-shaped connecting portion of the centrifugal weight associated therewith.

29. A centrifugal clutch for small motors such as for hand-guided portable apparatus including chain saws, cut-off machines, mopeds or the like comprising:

a carrier adapted to be rotatably driven by the motor of the apparatus thereby defining an axis of rotation, said carrier having a hub concentric with said axis and a plurality of carrier arms extending radially therefrom;

a clutch drum disposed in surrounding relationship to said carrier;

a plurality of centrifugal weights mounted on and corresponding to respective ones of said arms, each one of said weights having a radially extending U-shaped connecting portion formed thereon for slidably engaging the arm corresponding thereto for movement in the radial direction between a rest position whereat said weights are disengaged from said clutch drum and an active position whereat said weights are in contact engagement with said drum for transmitting torque thereto from said carrier;

a plurality of holders corresponding to respective ones of said weights for securing said weights against displacement in a first direction parallel to said axis;

each one of said weights and the connecting portion thereof defining two end faces facing in respective ones of said first axial direction and a second direction parallel to said axis and opposite to said first direction; each one of said holders being a single unitary sheet metal piece including a mid portion extending between said end faces parallel to said axis and two legs extending at right angles from said mid portion for engaging corresponding ones of said end faces and overlapping said carrier arm associated with said weight; and, biasing means for resiliently biasing said weights into said rest position when said clutch is at standstill and the mass of said weights being selected to overcome the biasing force with centrifugal force at a predetermined rotational speed of said carrier whereafter said weights move into said active position.

* * * * *

UNITED STATES PATENT AND TRADEMARK OFFICE
CERTIFICATE OF CORRECTION

PATENT NO. : 4,625,849

DATED : December 2, 1986

INVENTOR(S) : Reinhard Gommel

It is certified that error appears in the above-identified patent and that said Letters Patent is hereby corrected as shown below:

In column 1, line 8: delete "chains" and substitute -- chain -- therefor.

In column 4, line 62: delete "carriers" and substitute -- carrier -- therefor.

In column 5, line 55: delete "or" and substitute -- of -- therefor.

In column 8, line 40: delete "centrigual" and substitute -- centrifugal -- therefor.

In column 8, line 54: delete "drive" and substitute -- driven -- therefor.

UNITED STATES PATENT AND TRADEMARK OFFICE
CERTIFICATE OF CORRECTION

PATENT NO. : 4,625,849

DATED : December 2, 1986

INVENTOR(S) : Reinhard Gommel

It is certified that error appears in the above-identified patent and that said Letters Patent is hereby corrected as shown below:

In column 9, line 36: delete "drive" and substitute -- driven -- therefor.

In column 9, line 57: delete "and,".

In column 10, line 4: after the word "apparatus" add -- including --.

In column 11, line 62: delete "weight" and substitute -- weights -- therefor.

Signed and Sealed this

Twenty-eighth Day of April, 1987

Attest:

DONALD J. QUIGG

Attesting Officer

Commissioner of Patents and Trademarks